United States Patent
Wiesbeck et al.

(10) Patent No.: US 7,847,731 B2
(45) Date of Patent: Dec. 7, 2010

(54) METHOD FOR THE OPERATION OF AN ANTENNA GROUP HAVING A PLURALITY OF TRANSMITTERS AND A PLURALITY OF RECEIVERS AND ASSOCIATED APPARATUS

(75) Inventors: Werner Wiesbeck, Keltern (DE); Karin Schuler, Ulm (DE)

(73) Assignee: Universitat Karlsruhe, Karlsruhe (DE)

( * ) Notice: Subject to any disclaimer, the term of this patent is extended or adjusted under 35 U.S.C. 154(b) by 107 days.

(21) Appl. No.: 12/195,519

(22) Filed: Aug. 21, 2008

(65) Prior Publication Data

US 2009/0051593 A1 Feb. 26, 2009

(30) Foreign Application Priority Data

Aug. 23, 2007 (DE) .................. 10 2007 039 897

(51) Int. Cl.
*H01Q 3/00* (2006.01)
(52) U.S. Cl. ...................................... 342/360; 342/373
(58) Field of Classification Search .................. 342/25, 342/169, 173, 360, 368, 372, 373; 455/562.1
See application file for complete search history.

(56) References Cited

U.S. PATENT DOCUMENTS

| 5,920,285 A | 7/1999 | Benjamin | 342/368 |
| 6,288,672 B1 | 9/2001 | Asano et al. | 342/374 |
| 7,289,058 B2 | 10/2007 | Shima | 342/70 |

FOREIGN PATENT DOCUMENTS

JP   2007 199085   9/2007

OTHER PUBLICATIONS

K. Schuler, M. Younis, R. Lenz and W. Wiesbeck describe in "Array Design for Automotive Digital Beamforming Radar System", Radar Conference, 2005 IEEE International, May 9-12, 2005, pp. 435-440.
A.T. Villeneuve, "Taylor Patterns for Discrete Arrays", IEEE Transactions on Antennas and Propagation, vol. AP-32, No. 10, Oct. 1984, pp. 1089 to 1093.

*Primary Examiner*—Dao L Phan
(74) *Attorney, Agent, or Firm*—Renner Kenner Greive Bobak Taylor & Weber

(57) ABSTRACT

The present invention relates to a method for the operation of an antenna group (1) having M≧2 transmitters and N≧2 receivers (3) for the digital beamforming. In the method, a coherent transmit signal is transmitted in a transmit-receive-cycle via each of the M transmitters (2) into an area to be monitored, and a coherent receive signal from the area is recorded by each of the N receivers (3) for each transmit signal so that M·N receive signals are obtained. To each receive signal, a combination of the respective transmitting transmitter (2) and the respective receiving receiver (3) is allocated. The M·N receive signals are processed by means of digital beamforming to obtain spatial information about objects in the area to be monitored. In the method, each of the M·N receive signals is multiplied during processing by an amplitude factor which is individually allocated to the respective combination of transmitter (2) and receiver (3), wherein the amplitude factors are selected such that an increase of the signal dynamic range at the digital beamforming is achieved. The method and the apparatus formed for the execution of the method allow a high angle resolution and, at the same time, a high signal dynamic range.

13 Claims, 3 Drawing Sheets

METHOD FOR THE OPERATION OF AN ANTENNA GROUP HAVING A PLURALITY OF TRANSMITTERS AND A PLURALITY OF RECEIVERS AND ASSOCIATED APPARATUS

TECHNICAL FIELD OF APPLICATION

The present invention relates to a method for the operation of an antenna group having $M \geq 2$ transmitters and $N \geq 2$ receivers, in which a coherent transmit signal is transmitted in a transmit-receive-cycle via each of the M transmitters into an area to be monitored, and a coherent receive signal from the area is recorded by each of the N receivers for each transmit signal, wherein M·N receive signals are obtained, and to each of the receive signals a combination of the respectively transmitting transmitter and the respectively receiving receiver is assigned, and in which the M·N receive signals are processed by means of digital beamforming to obtain spatial information about the objects in the area to be monitored. The invention relates in addition to an apparatus for radar monitoring of an area, which utilizes the method.

The method and the apparatus utilize the technique of digital beamforming (DBF: Digital Beamforming), in which for each receiver the receive signals are digitalized and processed separately, whereby a subsequent beamforming during scanning of the area to be monitored is allowed. This requires the use of multi-channel analog/digital converters, sufficient storage space for storing the digitalized receive signals and a computing processor for processing the data for the digital beamforming.

BACKGROUND ART

K. Schuler, M. Younis, R. Lenz and W. Wiesbeck describe in "Array design for automotive digital beamforming radar system", Radar Conference, 2005 IEEE International, May 9-12, 2005, pages 435-440, a method and an apparatus for monitoring an area by means of the technique of digital beamforming, in which an antenna array having a plurality of transmitters and a plurality of receivers is used. The monitored area is imaged by means of radar, wherein in the dimensions distance and angle the spatial position of objects in the monitored area is determined. The angle resolution results from the phase differences of the signals received by different receivers at the same time. The resolution increases with the number of combinations of transmitter and receiver for which an evaluable receive signal is received. In the method proposed in this publication, a plurality of transmitters are used, which transmit their transmit signals in chronological succession to the same area. By means of each separate digitalization of signals received by the individual receivers for each of the transmitters, with M transmitters and N receivers, M·N receive signals are available for the digital beamforming. Such a multi-transmitter/multi-receiver-system, compared to other known radar systems, offers the advantage of an angle resolution which is independent of the bandwidth. These systems play an increasingly important role in automobile short-range sensor systems.

Systems with a plurality of transmitters and a plurality of receivers offer already, on the one hand, with a small number of transmitters and receivers a high resolution, but on the other hand, only a moderate dynamic range.

For conventional antenna systems with only one transmitter and a plurality of receivers for radar monitoring, it is known to increase the dynamic range of the angle measurement by means of an amplitude weighting. Such amplitude weighting, however, achieves the desired result only if a high number of receivers is available. Only then the necessary degrees of freedom are available to increase the dynamic range of the measurement considerably. This, however, does not apply for the systems with a plurality of transmitters and a plurality of receivers considered here, because those, in general, are aimed to offer a good resolution with a small number of elements, in particular with less than four transmitters and less than four receivers. An application of amplitude weighting to the small number of transmitters or the small number of receivers can not result in a noticeable increase of the dynamic range in such a case.

It is an object of the present invention to provide a method for the operation of an antenna group comprising a plurality of transmitters and a plurality of receivers, which allows a substantial increase of the dynamic range. Furthermore, an apparatus is to be provided, by means of which the method can be performed.

DESCRIPTION OF THE INVENTION

The object is achieved by means of the method and the apparatus according to the patent claims 1 and 8. Advantageous embodiments of the method and the apparatus are subject matter of the sub-claims or can be learned from the following description and the exemplary embodiment.

In the proposed method for the operation of an antenna system or an antenna group, respectively, comprising $M \geq 2$ transmitter and $N \geq 2$ receiver, a coherent transmit signal is transmitted in a known manner in a transmit-receive-cycle via each of the M transmitters to the area to be monitored, and for each transmit signal a coherent receive signal from the area is recorded by the N receivers, wherein M·N receive signals are obtained. To each receive signal, a combination of the respective transmitting transmitter, for which the receive signal is obtained, and the respective receiving receiver, which receives this receive signal, is allocated so that the M·N receive signals can be processed subsequently by means of digital beamforming, to obtain the desired spatial information, in particular angle and distance, about the objects in the area to be monitored. The proposed method is characterized in that each of the M·N receive signals during processing is multiplied by an amplitude factor, which is individually assigned to the respective combination of transmitter and receiver, wherein the amplitude factors are selected such that they cause an increase of the signal dynamic range at the digital beamforming.

Hence, in the proposed method, an amplitude weighting is not, as previously usual, applied to the transmitters and/or the receivers. The amplitude weighting is rather applied to all combinations of transmitters and receivers, and hence receive signals, which are evaluated during processing. Therefore, for selection of the amplitude weighting, not only M+N but M·N degrees of freedom are available. Thereby, the dynamic range for multi-transmitter-multi-receiver antenna groups with only a small number of transmitters and receivers can also be increased considerably. The method and the associated apparatus hence allow the utilization of a multi-transmitter-multi-receiver system for digital beamforming, which, at the same time, by means of the utilization of as few transmitters and receivers as possible, can achieve a high angle resolution, and on the other hand, a high dynamic range.

The amplitude factors are provided for the proposed method and the proposed apparatus preferably in the form of a weighting matrix, in which each matrix element is allocated to another combination of transmitter and receiver. For determining of the amplitude factors, in an advantageous embodiment of the method, a mapping of this antenna group onto a virtual or equivalent antenna group, respectively, having only one transmitter and a plurality of receivers, is carried out. To this virtual system, the previously already known weighting functions can then be applied as vector weighting. By a revertive mapping onto the multiple transmitter-multiple-receiver system, from this vector weighting, the desired matrix weighting is then generated. The mapping of the antenna group having a plurality of transmitters and a plurality of receivers takes place in consideration of the respective phase relations between transmitters and receivers of this antenna group. The same phase relations have to exist in the virtual antenna group between the virtual transmitter and the virtual receiver. This can be derived from a purely geometrical view. This results basically in a virtual antenna group having a virtual transmitter and M·N virtual receivers. A particular advantage of this approach is that for one-transmitter-multiple-receiver antenna groups, numerous weighting functions for an amplitude weighting are already known, so that for achieving of the same effect for the here considered antenna group having a plurality of transmitters and a plurality of receivers, it is only necessary to go back to these known functions. The weighting matrix then can be generated in a simple manner via the described mapping and the subsequent revertive mapping.

The antenna group used with the method preferably comprises less than ten transmitters and less than ten receivers, and, more preferably less than four transmitters and less than four receivers. As a coherent transmit signal, a signal with a temporally changing frequency (chirp) can be used in a known manner. In the preferred embodiment, the transmit signals of the different transmitters are transmitted in a chronological sequence by switching between the transmitters. However, it is basically also possible to code the transmit signals of the different transmitters differently so that they can be transmitted at the same time. In this case, due to the different coding, the allocated receive signals can be allocated to the different transmitters. Furthermore, it is not required in all cases that all receivers receive at the same time. Specifically in case of stationary objects in the area to be monitored, the receivers, for example, can also be switched for reception in a chronological sequence.

The proposed apparatus for radar monitoring of an area thus comprises at least one antenna group having $M \geq 2$ transmitters and $N \geq 2$ receivers. A transmit-receive unit, which is also required, transmits in a transmit-receive cycle, which, of course, can be carried out consecutively as often as desired, a coherent transmit signal via each of the M transmitters to the area to be monitored and receives with the N receivers for each of the transmit signals a respective receive signal from the area, and records it separately. To each of the recorded M·N receive signals, a combination of the respectively transmitting transmitter and the respectively receiving receiver is allocated. In a device for digital beamforming, the M·N receive signals for digital beamforming are then processed to obtain the desired spatial information about objects in the monitored area. The device for digital beamforming with this apparatus is formed such that it multiplies each of the receive signals during processing by an amplitude factor which is individually allocated to the respective combination of transmitter and receiver, wherein the amplitude factors are selected such that they cause an increase of the signal dynamic range at the digital beamforming.

Here, the amplitude factors are preferably stored in the form of a M×N matrix in a storage unit of the apparatus, wherein each matrix element is allocated to a different combination of transmitter and receiver. The storage unit is also required for storing of the M·N receive signals of each receive cycle. The transmit and receive device comprises a multi-channel analog/digital converter in order to be able to digitalize the receive signals received from the multiple receivers independently from each other at the same time. The central component of the device for beamforming is a microprocessor that performs the computing steps for the digital beamforming.

In a preferred embodiment, the apparatus comprises in addition a switching unit, by means of which the transmit signals can be allocated in a chronological sequence to the different transmitting antennas.

The transmitters and receivers of the antenna group are preferably arranged linear in a row, but can also be formed, for example, as two-dimensional array in one plane. As a basic principle, with a linear antenna arrangement, a scanning can be performed in the plane which is spanned by the linear arrangement of the antenna elements and their main emission direction. Hereby, of course, any orientation of this plane in the space is possible. With a two-dimensional arrangement of the antenna elements in one plane, the entire solid angle can be scanned.

With the amplitude weighting of the M·N receive signals, preferably in the form of a weighting matrix, M·N degrees of freedom are achieved for selection of the amplitude factors. Hence, there are considerably more degrees of freedom available compared to the determination of two separate weighting vectors for the M transmitters and the N receivers with M+N degrees of freedom, as this is known for the typical application of weighting functions. The method hence allows a substantially higher flexibility for the determination of the weighting function, and thereby a higher dynamic range at angle measurement. Hence, with the proposed method, weighting functions, which offer a high dynamic range but until now can only be used with a high number of L elements, i.e. transmitters and/or receivers, can now be used also with $2 \cdot \sqrt{L}$ elements. Through this, antennas, and hence hardware cost, can be saved.

BRIEF DESCRIPTION OF THE DRAWINGS

The proposed method and the associated apparatus are described again hereinafter in more detail by means of an exemplary embodiment in connection with the drawings. In the figures

WAYS FOR CARRYING OUT THE INVENTION

In antenna groups having a plurality of transmitters and a plurality of receivers for digital beamforming, all antenna lobes of the transmitters or transmitting antennas, respectively, are overlapping in the area to be monitored. Thereby, the transmitters are preferably connected in a chronological sequence. On the receiving side, the plurality of receivers or receiving antennas, respectively, receive the coherent signals, preferably simultaneously. Each receive signal is separately digitized and stored.

Figure 1:
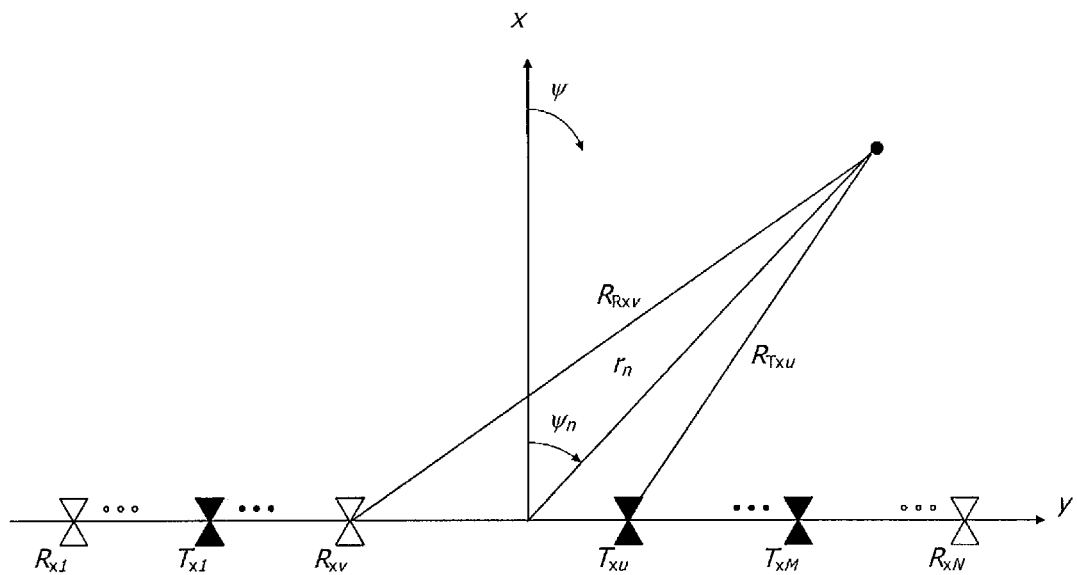
FIG. 1 shows an example for an arrangement of the transmitters and receivers of an antenna group having a plurality of transmitters and a plurality of receivers.

Below, an antenna having a plurality of transmitters and a plurality of receivers in linear arrangement is described with reference to FIG. 1 by way of example. For simplification, only the phase centers of the individual antennas are observed. Here, M transmitting antennas $T_{x1}$ to $T_{xM}$ and N receiving antennas $R_{x1}$ to $R_{xN}$ are arranged along the y-axis. The position of a stationary reflecting object in the xy-plane is described through distance $r_n$ and the azimuth angle $\psi_n$. This is illustrated in FIG. 1. The transmit signal $S_T(t)$ of each transmitting antenna is a pulsed chirp signal:

$$s_T(t) = e^{j2\pi f_0 t + j2\pi k_e t^2} rect\left[\frac{t}{T_P}\right] \quad (1)$$

wherein $k_e = B/(2T_p)$ defines the chirp rate as ratio between the bandwidth B and the pulse duration Tp. Of course, the transmit signal of the proposed method is not limited to the above form, but to understand here as an example only. The receive signal sR(t) also represents a chirp signal which is delayed by the propagation time $\tau_n = (R_{Txu} + R_{Rxv})/c_0$:

$$S_R(t) = e^{j2\pi f_0(t-\tau_n) + j2\pi k_e(t-\tau_n)^2} rect\left[\frac{t-\tau_n}{T_P}\right] \quad (2)$$

During signal processing, first a range compression is performed, which provides the signal $f_{rc}(\tau)$ compressed in the range:

$$f_{rc}(\tau) = \frac{\sin\{2\pi k_e(T_P|\tau - \tau_n| - (\tau - \tau_n)^2)\}}{2\pi k_e(\tau - \tau_n)} \cdot rect\left[\frac{|t - \tau_n|}{T_P}\right] \quad (3)$$

$$e^{j2\pi k_e T_P(\tau - \tau_n)} e^{j\frac{2\pi}{\lambda}(R_{Txu} + R_{Rxv})}$$

For azimuth compression, only the phase of the carrier signal is considered. The azimuth compression is carried out through a multiplication with a test phase, depending on the focussing angle $\psi_0$. The total summation over all transmitters and receivers results in the signal $f_{ac}$ compressed in the azimuth:

$$f_{ac} = \sum_{u=1}^{M} \sum_{v=1}^{N} k_{u,v} \cdot e^{-j\frac{2\pi}{\lambda}(R_{Txu} + R_{Rxv})} \left[e^{-j\frac{2\pi}{\lambda} k_{ac}(\psi_0, u, v)}\right]^* \quad (4)$$

The important function is the Kernel function $K_{ac}$. The same can be approximated by the phase which would cause a target at a certain angle in the far field.

$$K_{ac}(\psi_0, u, v) = -(x_{tu} + x_{rv})\cos(\psi_0) - (y_{tu} + y_{rv})\sin(\psi_0) \quad (5)$$

In equation (4), $k_{u,v}$ represents the weighting function which is differentiated below. With the assumption of a constant weighting ($k_{u,v}$=1) and equally spaced transmitters and receivers along the y-axis with the distance $\Delta y_T$ and $\Delta y_R$, and an object at an azimuth angle sin $\psi_n$, the signal compressed in the azimuth can be written as follows:

$$f_{ac} = \frac{\sin\left\{\frac{\pi M}{\lambda}\Delta y_T(\sin\psi_n - \sin\psi_0)\right\}}{\sin\left\{\frac{\pi}{\lambda}\Delta y_T(\sin\psi_n - \sin\psi_0)\right\}} \cdot \frac{\sin\left\{\frac{\pi N}{\lambda}\Delta y_R(\sin\psi_n - \sin\psi_0)\right\}}{\sin\left\{\frac{\pi}{\lambda}\Delta y_R(\sin\psi_n - \sin\psi_0)\right\}} \quad (6)$$

This is equivalent to a multiplication of two array factors. It means that the digital beamformation with a plurality of transmitters provides an azimuth compression with the same result as the multiplication of the array factors of the transmit and receive array. Thereby, the level SSL of the side maxima (SLL: side lobe level) is given through the multiplication of the two array functions. In a conventional approach, amplitude weighting functions for reducing of SLL would be applied individually for the transmitter and the receiver group. For a multi-transmitter-multi-receiver array for digital beamforming (DBF), however, a number of transmitters and receivers as low as possible is used, because therewith a high angle resolution is already obtained. The conventional application of the amplitude weighting, however, due to this low number of transmitters and receivers, would not provide any significant contribution for the reduction of the SLL and hence to the increase of the signal dynamic range.

In the proposed method, however, the combinations of transmitting and receiving antennas are considered as they are also needed for the digital beamforming. Hence, amplitude factors for all combinations of transmitting and receiving antennas are selected individually. For this purpose, in the present example, an equivalent array is considered, hereinafter denoted also as virtual single-transmitter-multi-receiver antenna group. This virtual antenna group consists of only one virtual transmitter $\tilde{T}_x$ and M·N virtual receivers $\tilde{R}_{xuv}$, which are arranged along the y-axis. To this virtual antenna group, a conventional, known weighting function can be applied.

Figure 2:
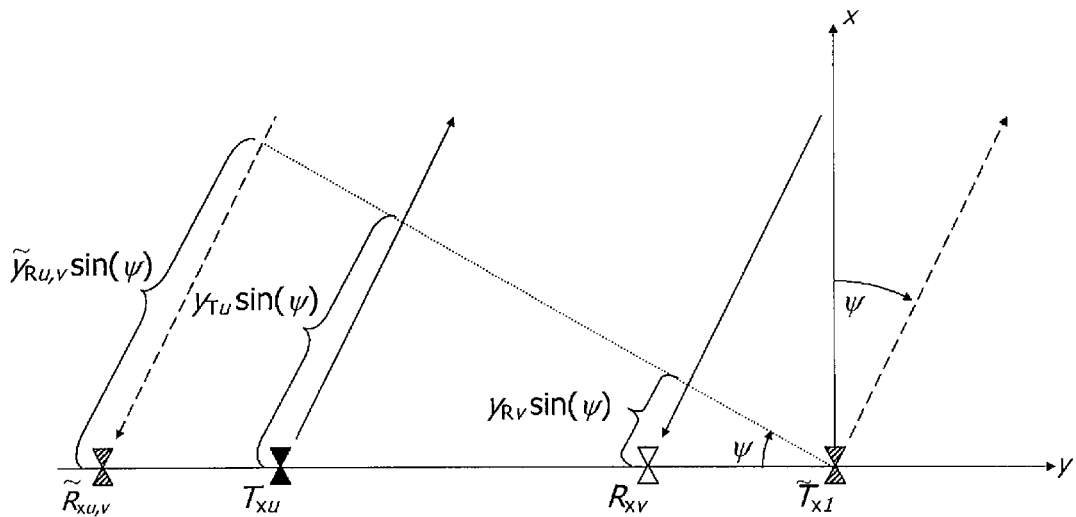
FIG. 2 shows an illustration of the geometry at the derivation of the virtual system having one virtual transmitter and a plurality of receivers.

For determination of the virtual antenna group, the phase relations between the transmitting antenna and the receiving antennas are considered. For this, FIG. 2 shows the electric phase at an array having a plurality of transmitters and a plurality of receivers. The electrical phase is considered with reference to the origin of the coordinate system. The transmit signal of the transmitter $T_{xu}$ has the phase $\phi_{Txu}$ relative to a transmitter at the origin of the coordinate system.

$$\phi_{Txu} = y_{Tu}\sin(\psi) \quad (7)$$

This consideration is performed for all transmitters. For all receivers, comparable considerations are made. At the receiver Rxv, the phase $\phi_{Rxv}$ relative to a receiver at the origin is:

$$\phi_{Rxv} = y_{Rv}\sin(\psi) \quad (8)$$

With a substitution of the physical transmitting and receiving antennas $T_{xu}$ and $R_{xv}$ by a virtual transmitter $\tilde{T}_x$, which is located at the origin of the coordinate system, and by a virtual receiver $\tilde{R}_{xuv}$, the total phase $\tilde{\phi}_{Rxu}$ has to remain equal relative to the origin:

$$\tilde{\phi}_{Rxv} = \phi_{Txu} + \phi_{Rxv}$$

$$\tilde{y}_{Tu,v}\sin(\psi) = y_{Tu}\sin(\psi) + y_{Rv}\sin(\psi) \quad (9)$$

$$\tilde{y}_{Ru,v} = y_{Tu} + y_{Rv}$$

The position of the virtual receiver $\tilde{R}_{xuv}$ is hence a function of the position of the associated transmitter $T_{xu}$ and receiver $R_{xv}$.

The number of elements of the virtual array is M·N, the product of the elements of the multi-transmitter-multi-receiver array.

Figure 3:
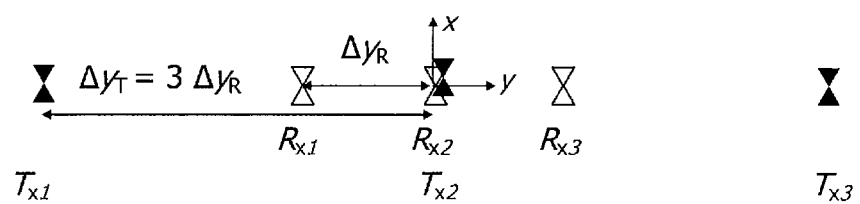
FIG. 3 shows a further example for an arrangement of the transmitters and receivers of an antenna array having a plurality of transmitters and a plurality of receivers.
Figure 4:
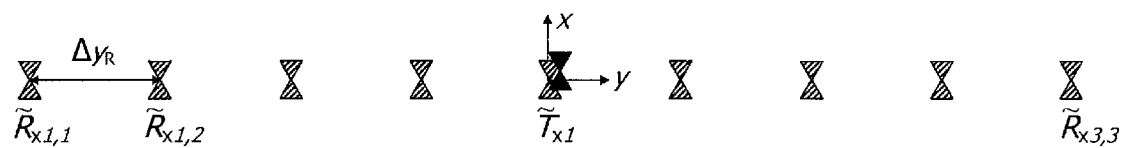
FIG. 4 shows an example for the virtual antenna system derived from FIG. 3 having one virtual transmitter and a plurality of virtual receivers.

For illustration of the mapping of an array having a plurality of transmitters and a plurality of receivers onto a virtual array having one virtual transmitter and a plurality of virtual receivers, an array having M=3 transmitters and N=3 receivers is exemplary considered in connection with FIG. 3. This array has an equidistant configuration with a distance of $\Delta y_T = N \cdot \Delta y_R$ and $\Delta y_R = 0,6 \lambda$. The virtual array having one virtual transmitter and a plurality of receivers equivalent to this array is shown in FIG. 4. Its extension is $(M-1) \cdot \Delta y_T + (N-1) \cdot \Delta y_R$. Based on the values which are selected exemplary only, it is equidistant. However, this represents only a specifically selected example which is generally not the case.

To this virtual array, any amplitude weighting function can now be applied as it is known from the state of the art. The amplitude coefficients $k_{u,v}$ are generally defined in the following table 1.

TABLE 1

| $R_{xu,v}$ | $R_{x1,1}$ | $R_{x1,2}$ | ... | $R_{xM,N}$ |
|---|---|---|---|---|
| $k_{u,v}$ | $k_{1,1}$ | $k_{1,2}$ | ... | $k_{M,N}$ |

When the amplitude coefficients $k_{u,v}$ are defined for the equivalent receiving antennas $R_{xu,v}$, their position has to be considered. In order to apply this weighting to the configuration having a plurality of transmitters and a plurality receivers, it has to be transformed into the different combinations of receivers and transmitters. For this, the relation between the virtual receiver and the associated transmitters and receivers according to equation (9) is applied. This results in a weighting matrix as illustrated in table 2.

TABLE 2

|  | $R_{x1}$ | $R_{x2}$ | ... | $R_{xN}$ |
|---|---|---|---|---|
| $T_{x1}$ | $k_{1,1}$ | $k_{1,2}$ | ... | $k_{1,N}$ |
| $T_{x2}$ | $k_{2,1}$ | $k_{2,2}$ | ... | $k_{2,N}$ |
| ... | ... | ... | ... | ... |
| $T_{xM}$ | $k_{M,1}$ | $k_{M,2}$ | ... | $k_{M,N}$ |

As an example, the known Villeneuve-weighting function can be used here, which is applicable for small arrays. This weighting function can be found, for example, in A. T. Villeneuve, "Taylor Patterns for Discrete Arrays", IEEE Transactions on Antennas and Propagation, Vol. AP-32, no. 10, 1984, pages 1089 to 1093. With the application of this weighting function to the virtual array according to FIG. 4 consisting of M·N=9 elements, the amplitude coefficients are provided as shown in table 3.

TABLE 3

| i | 1.9 | 2.8 | 3.7 | 4.6 | 5 |
|---|---|---|---|---|---|
| $k_i$ | 0.1239 | 0.3451 | 0.6387 | 0.8981 | 1 |

Of course, other weighting functions are possible too. Based on the small numbers of elements of the antenna group, the application of the Villeneuve weighting function, however, results normally in the best results. The amplitude coefficients of the weighting matrix for the multi-transmitter-multi-receiver antenna group of FIG. 3, obtained through the revertive mapping of the virtual array, are shown in table 4.

TABLE 4

| 0 | $R_{x1}$ | $R_{x2}$ | $R_{x3}$ |
|---|---|---|---|
| $T_{x1}$ | 0.1239 | 0.3451 | 0.6387 |
| $T_{x2}$ | 0.8981 | 1 | 0.8981 |
| $T_{x3}$ | 0.6387 | 0.3451 | 0.1239 |

The application of these amplitude coefficients results in a substantial decrease of the side maxima at the beamforming and hence in substantial increase of the dynamic range without reducing the angle resolution.

Figure 5:
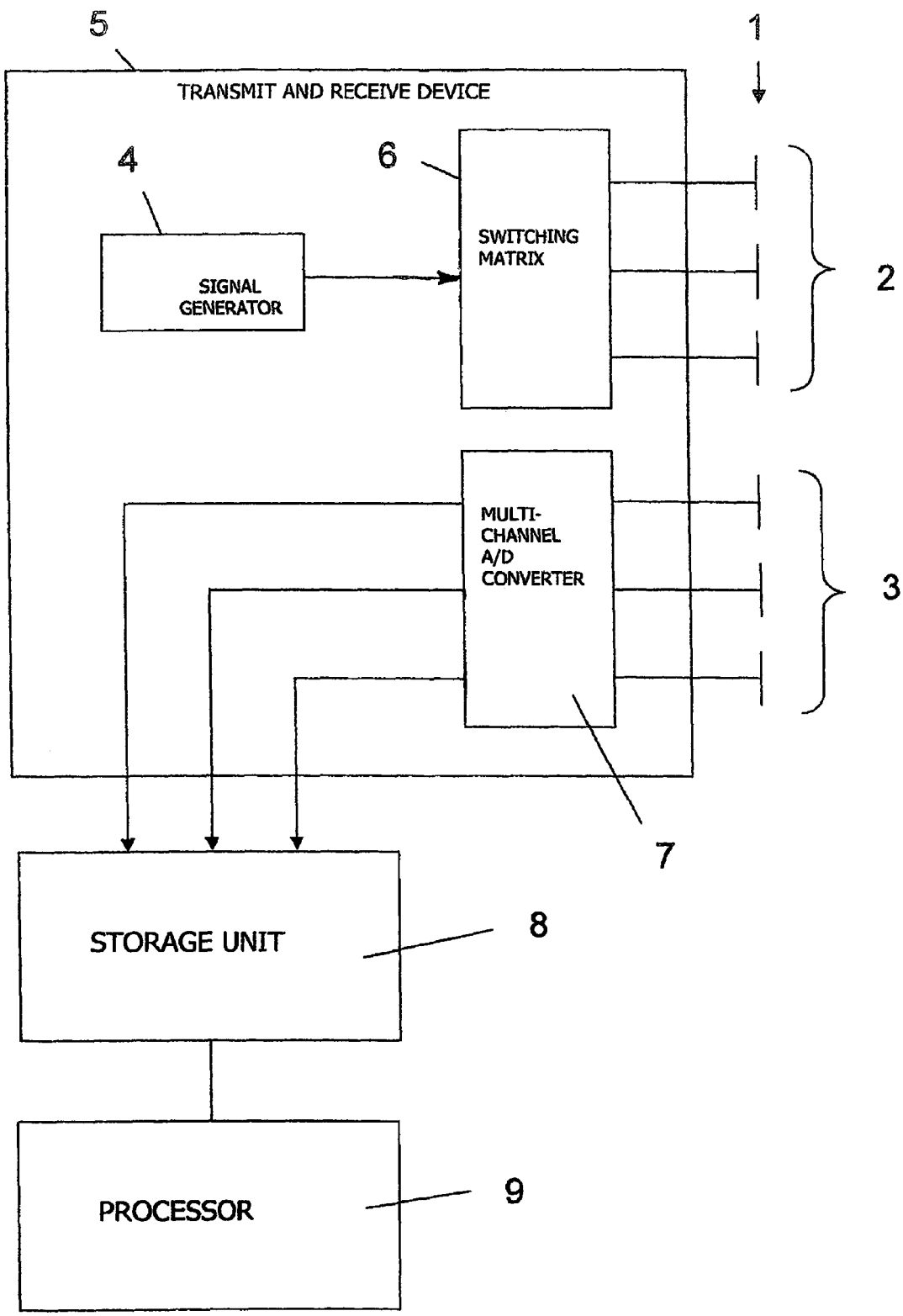
FIG. 5 shows a schematic illustration of an apparatus operating according to the method.

FIG. 5 finally shows an example for an apparatus that implements the proposed method. The apparatus comprises an antenna group 1 with a plurality of transmitting antennas 2 and receiving antennas 3, which are arranged linear. The transmitting antennas and the receiving antennas are connected with a transmit and receive device 5, having a signal generator 4 for generation of a chirped transmit signal and a switching matrix 6. The chirped transmit signal is applied via the switching matrix 6 in a chronological sequence to the different transmit antennas 2. The transmit and receive unit 5 comprises in addition a multi-channel analog/digital converter 7, which separately digitalizes the receive signals received by the receiving antennas 3 within the respective time windows, and stores them in a storage unit 8. Thereby, to each of the individual digitalized receive signals, the respective combination of the receiver, from which the receive signal comes, and the transmitter, which has transmitted the associated transmit signal, is allocated. The receive signals are then subject of the desired digital beamforming in a computing processor 9, for which the weighting matrix stored in storage 8, for the multiplication of the receive signals with the associated amplitude factors is retrieved, to determine in this manner the distance and angle of objects in the monitored area with higher accuracy.

As a matter of course, the apparatus can be formed at any time in a different form, as long as the required digital beamforming and the multiplication with the amplitude factors of the weighting matrix are allowed.

While the invention has been illustrated and described in detail in the drawings and foregoing description, such illustration and description are to be considered illustrative or exemplary and not restrictive. The invention is not limited to the disclosed embodiments. The different embodiments described above and in the claims can also be combined. Other variations to the disclosed embodiments can be understood and effected by those skilled in the art in practicing the claimed invention, from the study of the drawings, the disclosure and the appended claims. In the claims, the word "comprising" does not exclude other elements or steps, and the indefinite article "a" or "an" does not exclude a plurality. The mere fact that measures are recited in mutually different dependent claims does not indicate that a combination of these measures can not be used to advantage. The reference signs in the claims should not be construed as limiting the scope of these claims.

| REFERENCE LIST | |
|---|---|
| 1 | Antenna group |
| 2 | Transmitting antennas |
| 3 | Receiving antennas |
| 4 | Signal generator |
| 5 | Transmit and receive device |

-continued

REFERENCE LIST

| | |
|---|---|
| 6 | Switching matrix |
| 7 | Multi-channel A/D converter |
| 8 | Storage unit |
| 9 | Processor |

The invention claimed is:

1. A method for the operation of an antenna group (1) having M≧2 transmitters (2) and N≧2 receivers (3), in which a coherent transmit signal is transmitted in a transmit-receive-cycle via each of the M transmitters (2) into an area to be monitored and a coherent receive signal from the area is recorded by each of the N receivers (3) for each transmit signal, wherein M·N receive signals are obtained, and to each of the receive signals, a combination of the respectively transmitting transmitter (2) and the respectively receiving receiver (3) is allocated, and in which the M·N receive signals are processed by means of digital beamforming to obtain spatial information about the objects in the area to be monitored, characterized in that each of the M·N receive signals is multiplied during processing by an amplitude factor, which is individually allocated to the respective combination of transmitter (2) and receiver (3), and which causes an increase of a signal dynamic range at the digital beamforming.

2. The method according to claim 1, characterized in that the allocation of the amplitude factors to the combinations of transmitter (2) and receiver (3) takes place on the basis of a mathematical mapping of the antenna group (1) onto a virtual antenna group having only one virtual transmitter and M·N virtual receivers, which has the same phase relations between the virtual receivers and the virtual transmitter as between the transmitters (2) and the receivers (3) of the antenna group (1), wherein for the virtual antenna group, amplitude factors for an amplitude weighting of its virtual receivers are determined, which for such an antenna group increase the signal dynamic range at the digital beamforming, and these amplitude factors, by means of a revertive mapping onto the antenna group (1), are then allocated to the combinations of transmitters (2) and receivers (3) of this antenna group (1).

3. The method according to claim 1 or claim 2, characterized in that the transmit signals, by switching between the transmitters (2), are transmitted in a chronological sequence via the transmitters (2).

4. The method according to claim 1 or claim 2, characterized in that the receivers (3) for the reception of the receive signal for the transmit signal transmitted by a transmitter (2) each are switched within a common time window at the same time to reception mode.

5. The method according to claim 1 or claim 2, characterized in that the amplitude factors are provided in the form of a M×N-matrix, wherein each matrix element is allocated to a different combination of transmitter (2) and receiver (3).

6. The method according to claim 1, characterized in that the transmit signals are transmitted in the microwave range.

7. The method according to claim 1 or claim 2, characterized in that the antenna group (1) is used with less than ten transmitters (2) and less than ten receivers (3).

8. An apparatus for radar monitoring of an area, comprising at least one antenna group (1) having M≧2 transmitters (2) and N≧2 receivers (3), one transmit and receive device (5), which transmits a coherent transmit signal in a transmit-receive-cycle via each of the M transmitters (2) into an area to be monitored, and records from the N receivers (3) for each transmit signal a receive signal from the area, wherein M·N receive signals are obtained, and to each of the receive signals, a combination of the respectively transmitting transmitter (2) and the respectively receiving receiver (3) is allocated, and a device (9) for digital beamforming, which processes M·N receive signals by means of digital beamforming, to obtain spatial information about objects in the monitored area, characterized in that the device (9) for digital beamforming is formed such that it multiplies during processing each of the M·N receive signals by an amplitude factor, which is individually allocated to the respective combination of transmitter (2) and receiver (3).

9. The apparatus according to claim 8, characterized in that the amplitude factors are stored in the apparatus in the form of a M×N-matrix, wherein each matrix element is allocated to a different combination of transmitter (2) and receiver (3).

10. The apparatus according to claim 8, characterized in that a switching device (6) is provided through which the transmit signals, by means of switching between the transmitters (2), can be transmitted in a chronological sequence via the transmitters (2).

11. The apparatus according to claim 8, characterized in that the transmitters (2) and the receivers (3) are arranged two-dimensional in a plane, or one-dimensional in a row next to each other.

12. The apparatus according to claim 8 or claim 9, characterized in that the antenna group (1) comprises less than ten transmitters (2) and less than ten receivers (3).

13. The apparatus according to claim 8, characterized in that the transmit and receive device (5) is formed such that it switches the receivers (3) for the reception of the receive signals for the transmit signal transmitted by a transmitter (2), each within a common time window at the same time to reception mode.

* * * * *